United States Patent
Langosch

[15] 3,663,126
[45] May 16, 1972

[54] FLUID CONTROL SYSTEMS

[72] Inventor: Otto Paul Ferdinand Langosch, Camberg, Germany

[73] Assignee: Firma Vickers GmbH, Frolingstrasse, Bad Homburg v.d.H., Germany

[22] Filed: Dec. 5, 1969

[21] Appl. No.: 882,704

[30] Foreign Application Priority Data

Dec. 9, 1968 Germany..................P 18 13 500.7

[52] U.S. Cl............................................................417/300
[51] Int. Cl.............................................................F04b 49/00
[58] Field of Search.................417/300, 302, 304, 307, 308, 417/310; 137/117, 484.2

[56] References Cited

UNITED STATES PATENTS

| | | |
|---|---|---|
| 2,748,711 | 6/1956 | Drude....................................417/300 |
| 3,253,607 | 5/1966 | Drutchas..............................417/310 |
| 2,192,512 | 3/1940 | Twiss....................................417/302 |
| 2,791,229 | 5/1957 | Pasco....................................137/117 |
| 2,839,003 | 6/1958 | Thrap et al. ........................417/300 |
| 2,981,067 | 4/1961 | Clark et al. .........................417/300 |
| 3,128,783 | 4/1964 | Cowles et al.......................137/117 |
| 3,426,785 | 2/1969 | Brady et al.........................137/117 |
| 3,433,240 | 3/1969 | Lehmann.............................417/307 |
| 3,508,847 | 4/1970 | Martin..................................417/300 |

Primary Examiner—Carlton R. Croyle
Assistant Examiner—John J. Vrablik
Attorney—Barnes, Kisselle, Raisch & Choate

[57] ABSTRACT

A flow splitting relief valve is connected with the main output flow for tapping fluid from it for influencing the output characteristic.

4 Claims, 5 Drawing Figures 3,663,126

FLUID CONTROL SYSTEMS

The present invention relates to fluid control systems, and more particularly to such systems intended for servo-assisted steering arrangements, comprising a constant displacement variable speed pump with inlet and outlet connections, a choke, a pressure duct, a relief device which is arranged in the pressure duct, includes a relief valve, and serves to split up fluid from the pump in accordance with the speed of the latter into a relief flow and a controlled power flow, the latter passing through the choke, while the former is returned to the inlet connection of the pump.

Such pump systems are more particularly of importance for motor vehicles in which they can be driven with different speeds of rotation. In this application it is desirable that even at low speeds of rotation a pre-established regulated power flow is produced which can be used for instance for servo-assisted steering. The relief flow device ensures that this power flow maintains its characteristic even when the speed of operation is increased.

In the development and construction of such pump installations in accordance with the prior art it has not been possible to date to ensure that there is a satisfactory modification or control of the regulating characteristic. Pump arrangements have been previously proposed in which the bypass ends at a relief valve which is loaded by a spring. With such an arrangement a comparatively large power flow is produced even at low speeds of rotation of the pump. The rear face of the valve member is connected with the power flow duct so that a fall in pressure at the rear face of the valve member which is due to an increased speed of rotation brings about a displacement of the valve member and as a result the bypass duct is opened and a bypass current can flow. However, with such a pump arrangement it is only possible to achieve an upwardly sloping regulation characteristic, even though the slope is quite small. A further improvement of the regulation characteristic can be achieved in such a pump installation by connecting the rear face of the valve member with a venture-like narrowed portion in the duct which carries the regulated power flow. In the case of a previously proposed pump arrangement of this type an approximately constant regulated power flow is achieved by providing a nozzle-like section in the duct carrying the regulated power flow and arranging for this section to be modified by the relief valve.

In contrast to these previously proposed arrangements, a principal object of the present invention is to provide for a desirable downwardly sloping regulation characteristic in a pump arrangement of the above-mentioned type for servo-assisted arrangements.

The present invention consists in a fluid control system comprising a constant displacement variable speed pump with inlet and outlet connections, a choke, a pressure duct, a relief device which is arranged in the pressure duct, includes a relief valve, and serves to split up fluid from the pump in accordance with the speed of the latter into a relief flow and a controlled power flow, the latter passing through the choke, while the former is returned to the inlet connection of the pump, the relief device being adapted to abstract fluid from the power flow for influencing the regulation characteristic. With such an arrangement it is possible to achieve a satisfactory downwardly sloping regulation characteristic. Modifications can be made in the course of the regulation characteristic by modifying the design of the duct for abstracting fluid from the power flow.

In accordance with a convenient embodiment of the invention the opening and closing of the duct serving for abstraction of fluid from the regulated power flow is brought about by the relief valve controlling the relief flow.

In accordance with a still further feature of the invention the part of the relief valve controlling abstraction of fluid from the power flow comprises a valve piston with a constant cross section and provided with radially extending recesses running from one side of the piston and cooperating with a portion of wider diameter of the bore receiving the piston, the portion of wider diameter being connected with the duct for abstracting fluid from the regulated power flow.

In accordance with a further development of the invention the duct for abstracting fluid from the regulated power flow is provided with a bypass duct controlled by the relief device.

In accordance with a convenient arrangement the opening and closing of the bypass duct is also brought about by the relief valve.

In accordance with a further embodiment of the invention the pump arrangement is in the form of a two position flow regulator, serving for instance for controlling the lower ring of a load in such a manner that when the load is low in weight part of the fluid, for instance oil, displaced by the sinking load flows through the duct which also serves for abstracting fluid from the power flow so that the speed of lowering is greater than with a heavier load.

In accordance with an advantageous embodiment of the invention for improving the flow condition and external radial annular chamber is provided around the relief valve member influencing the relief flow and this chamber serves for providing for a radial evening out of flow forces.

The invention will now be described with reference to specific embodiments of it which are shown in the accompanying drawings.

Figure 1:
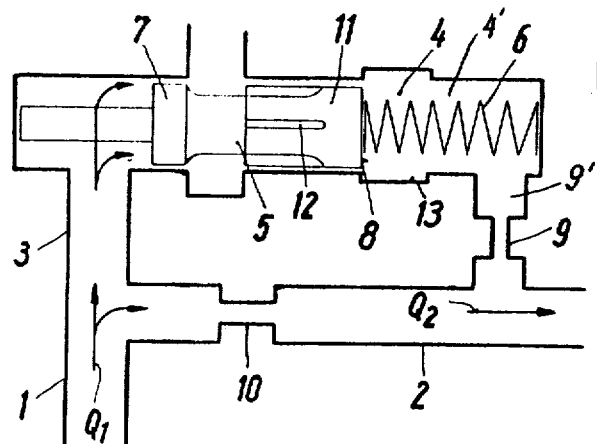
FIG. 1 shows diagrammatically a pump arrangement in accordance with the invention.

FIG. 1 shows diagrammatically a pump arrangement in accordance with the invention. A pump, not shown, forces a power flow $Q_1$ into the pressure duct 1, which splits up into a duct 2 for the regulated power flow $Q_2$ and a relief duct 3. A relief device, denoted by general reference numeral 4, comprises a relief valve 5 with a regulating chamber 4'. The valve 5 is urged by a spring 6 into the closed position, in which the valve member 7 closes the relief duct 3. The rear face or side 8 of the valve 5 is connected via a tapping duct 9' having a choke 9 with the duct 2 for the regulated power flow $Q_2$, which must pass through the choke 10. In this arrangement when the pump speed is increased pressure on the rear side 8 of the valve 5 is reduced so that the force of the spring 6 is overcome and the valve member opens the relief duct 3 so that a relief flow $Q_3$ can occur.

Furthermore on the piston or plunger 11 of the valve 5 recesses 12 are provided which run radially and longitudinally from one side of the piston. These recesses cooperate with further recesses 13 and form passages which tap or abstract a part $Q'_2$ of the regulated power flow $Q_2$.

Figure 3:
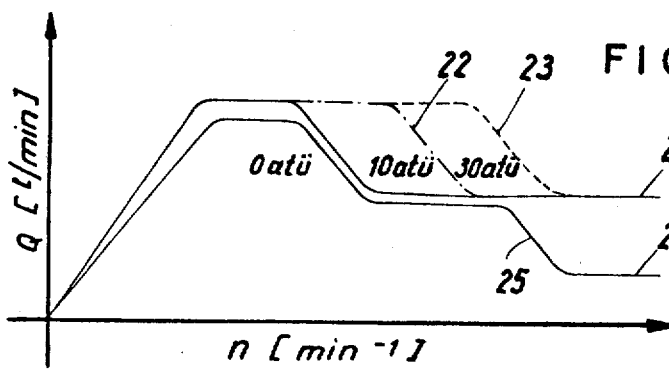
FIG. 3 is a graph of various regulation characteristics.

This provision results in a downwardly sloping regulation characteristic, denoted by reference numeral 21 in FIG. 3. The regulation characteristic 22 represented by dot-dash lines and the dash regulation characteristic 23 are modified and are produced by different fluid pressures in the system (for example 10-atmospheres gauge and 30-atmospheres gauge).

Figure 2:
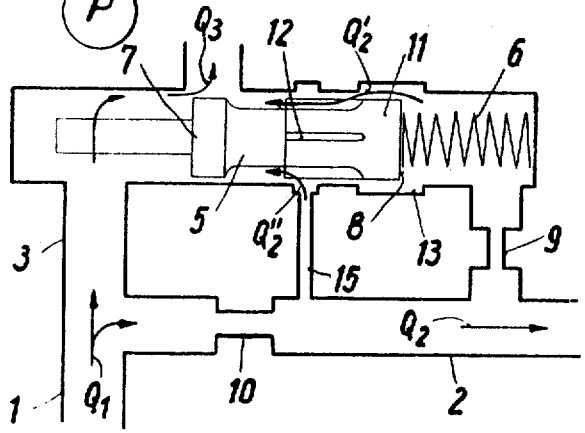
FIG. 2 shows a modified form of the arrangement shown in FIG. 1 including a bypass duct.

The regulation characteristic denoted by reference numeral 24 in FIG. 3 with its second downwardly sloping portion denoted by reference numeral 25 is obtained by a modification of the pump arrangement in accordance with the invention, this modification being shown in FIG. 2.

In accordance with FIG. 2 a pump, not shown, produces a flow $Q_1$ which passes into the pressure duct 1 and is split up when the relief valve 5 is opened, so that the valve member 7 opens the relief duct 3. The flow $Q_1$ is split up into a regulated power flow $Q_2$ and a relief flow $Q_3$. As was the case with the arrangement of FIG. 1 at a given speed of flow of the fluid a pressure drop is produced at the rear face or side 8 of the valve member 11, so that the force of the spring 6 is overcome, the valve 5 moves to the left and there is not only an opening of the relief valve but also a tapping or abstraction of fluid via the recesses 12 in the valve member 11, which cooperate with the recess 13. The part $Q'_2$ of the regulated power flow $Q_2$ which is tapped joins the flow $Q_3$. The power flow $Q_2$ passes through the choke 10. In addition to this tapping or abstraction connection or duct there is also a bypass duct 15, which is also opened by the valve 5 in a certain position so that a further partial flow $Q''_2$ is tapped off and the regulated power flow $Q_2$ undergoes a further drop in pressure, as is indicated by reference numeral 25 on the regulation characteristic as shown in FIG. 3. It is also possible to construct this bypass duct in a suitable manner in order to influence the course of the regulation characteristic 24 as may be desired. The pump arrangement is particularly simple since practically all control or regulating functions are performed by the valve 5.

Figure 4:
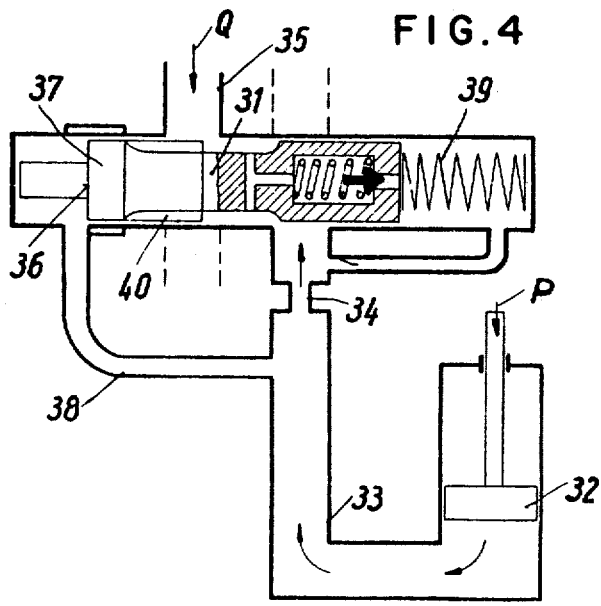
FIG. 4 shows a further embodiment of a pump arrangement in accordance with the invention.

FIG. 4 shows an embodiment of a pump arrangement or system in accordance with the invention which is arranged to operate as a two position flow regulator, more particularly for influencing lowering operation of a load to which the regulated power flow is delivered. The flow Q, originating from a pump which is not shown, passes through the valve 31 and raises the working piston 32. On lowering the load P the piston 32 sinks pari passu with the discharge of the regulated flow from the duct 33 via the choke 34 to the pump duct 35. In the case of the lowering of a relatively heavy load the pressure gradient is large and accordingly the valve member 37 only opens a relatively small flow cross section leading to the discharge or return duct 35. The recesses or slots 40 in this case interrupt the connection of the bypass duct 38 with the discharge duct 35, while in the case of loads to be lowered which are smaller in weight, a larger flow cross section is made available leading to the discharge duct. This larger cross section is brought about by the cooperation of the recesses 40, provided on the valve member 37, making possible a connection via the branch or abstracting duct 38, so that a more rapid lowering of the load P is possible owing to the more rapid discharge of fluid via the duct 33.

Figure 5:
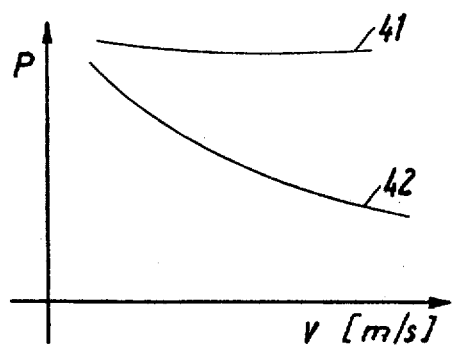
FIG. 5 is a graph of lowering speed characteristics.

FIG. 5 shows the speed of lowering as a function of load weight. The curve 41 relates to an installation in which no recesses or slots 40 are provided for opening a tapping or abstracting duct, while the curve 42 shows the increase in speed of lowering with a decrease in the weight of the load in the case of the pump system or arrangement in accordance with FIG. 4.

From the above it can be seen that in accordance with the invention in the case of pump systems downwardly sloping characteristics can be produced by the tapping or abstraction, as controlled by speed or rotation and/or load, of a part of the regulated power flow, it being possible by a suitable design of the tapping or abstraction duct to achieve an adaptation to suit different requirements. In this connection it is also possible to add a bypass duct to assist in modifying the regulation characteristics.

The embodiments of the invention in which an exclusive property or privilege is claimed are as follows:

1. In a control system of the type described comprising a constant displacement variable speed pump with an inlet and an outlet, a relief device including a relief valve having a regulating chamber, a choke, means for directing a portion of said flow from said outlet to said choke and another portion of said flow from said outlet to said relief device, said relief device serving to divide the flow from the pump in accordance with the speed of the latter into a relief flow through said relief device and a controlled power flow through said choke, the relief flow being returned to the inlet of the pump, the improvement comprising a tapping duct connected downstream of said choke to remove fluid from the controlled power flow and pass it to the regulating chamber of the relief device thereby influencing the regulation characteristic, said relief device including means for combining fluid from said regulating chamber directly with the fluid passing with the relief flow, said relief valve being arranged to open and close said last named means, part of the relief valve controlling the abstraction of fluid from the controlled flow comprising a valve piston with longitudinally extending peripheral passages which cooperate with a portion of the bore receiving the piston providing communication between the relief flow and the regulating chamber.

2. The structure as set forth in claim 1, in which the relief valve comprises a valve member which is surrounded by an annular chamber which serves for equalizing flow forces.

3. The structure as set forth in claim 1, further comprising a bypass duct connected in parallel with the tapping duct and extending from the regulated power flow to the relief device.

4. The structure as set forth in claim 3, in which the relief valve is arranged to open and close the bypass duct.

* * * * *